US006147597A

United States Patent [19]
Facory

[11] Patent Number: 6,147,597
[45] Date of Patent: Nov. 14, 2000

[54] VEHICLE-INTEGRATED ACCESS CONTROL DEVICE

[76] Inventor: Omar Facory, 832 Magnolia Ave. #9, Pasadena, Calif. 91106

[21] Appl. No.: 09/282,340

[22] Filed: Mar. 31, 1999

[51] Int. Cl.[7] .......... B60Q 1/00

[52] U.S. Cl. .......... 340/425.5; 340/825.31; 340/825.69; 340/825.72; 455/99; 307/10.1

[58] Field of Search .......... 340/825.31, 425.5, 340/545.1, 825.69, 825.72, 545.2, 427, 696.1; 307/10.1, 9.1; 455/95, 99, 128

[56] References Cited

U.S. PATENT DOCUMENTS

| | | | |
|---|---|---|---|
| 4,286,282 | 8/1981 | Wahl . | |
| 4,731,605 | 3/1988 | Nixon . | |
| 5,140,171 | 8/1992 | De Janasz | 307/10.8 |
| 5,473,318 | 12/1995 | Martel | 340/825.31 |
| 5,650,774 | 7/1997 | Drori | 340/825.32 |
| 5,748,101 | 5/1998 | Christensen et al. . | |
| 5,844,495 | 12/1998 | Griessbach | 340/825.31 |

*Primary Examiner*—Daniel J. Wu
*Assistant Examiner*—Toan Pham
*Attorney, Agent, or Firm*—Kleinberg & Lerner LLP; Marshall A. Lerner; Finn T. Simmensen

[57] ABSTRACT

For remotely operating security barriers such as gates, garage doors and the like by manipulating multiple pre-existing equipment controls of a motor vehicle simultaneously or successively, a vehicle-integrated access control device is described having an access control signal transmitter, an optional voltage regulator, and means for causing the operation of the transmitter to depend on the actuation in concert of several vehicle controls such as, for example, the simultaneous or rapidly successive actuation of the left and right turn signals of a motorcycle. A logical AND device and, alternatively, a pair of transistor switches are disclosed for establishing the dependency. One or more optional relays are disclosed for establishing the dependency. A latching circuit is described for establishing the dependency upon successive actuation of first and second circuits. Wires connected to the vehicle are disclosed for establishing input from the vehicle controls, power from the vehicle electrical system, and electrical grounding. A voltage reducing circuit, optionally including a voltage divider or a Zener diode, is disclosed for accommodating a lower voltage transmitter to a higher voltage vehicle electrical system.

13 Claims, 3 Drawing Sheets

VEHICLE-INTEGRATED ACCESS CONTROL DEVICE

FIELD OF THE INVENTION

The present invention relates to remote control devices, particularly to access control devices, and especially to garage door openers for motorcycles.

BACKGROUND

Remotely controlled motorized garage door openers have become popular with motorists who prefer to operate garage doors, security gates and the like without leaving their cars. Most such openers operate in response to a pre-set, coded radio signal. Commonly, the motorist carries a portable, battery-powered push-button transmitter in the car. To open the door or gate, the motorist reaches for the transmitter and pushes the button.

In order not to distract themselves searching for misplaced transmitters or reaching for unfamiliar controls, motorists commonly attach such a transmitter to the car's sun visor. They may also insert the transmitter in the vehicle's cigarette lighter socket or permanently install it on the vehicle, in which case batteries are unnecessary. A permanently installed transmitter is less likely to be misplaced or stolen. To prevent unwanted operation or inspection by children, prowlers and snoops, the transmitter may be wired so that it has no power until someone operates the ignition switch with the car key. Nixon, U.S. Pat. No. 4,731,605 and Wahl, U.S. Pat. No. 4,286,262 exemplify such installations.

A permanently installed transmitter may be triggered without distraction or fumbling if it is wired to one of the vehicle's pre-existing switches located within the motorist's reach. Christensen et al., U.S. Pat. No. 5,748,101 describe such an installation. The motorist briefly toggles the vehicle's headlamp dimmer switch one or more times to selectively operate one of several doors.

There may be times, however, when the motorist prefers not to flash the headlamp or other accessory that is normally controlled by the switch that triggers the transmitter. Such unintended operation might annoy the motorist and might also disclose the method of operation to bystanders. Motorcyclists, especially, would benefit from further refinements to the subtlety, safety and convenience with which they enter and leave secured areas.

SUMMARY OF THE INVENTION

It is an object of the present invention to allow motorists to conveniently operate remotely controlled security barriers by using familiar vehicular controls that have fixed locations, rather than by finding and operating unfamiliar controls of portable remote control devices.

It is another object of the present invention to allow the rapid, simple and durable installation of a remote control device in such a manner that the device is safely integrated with the vehicle electrical system and with the pre-existing controls of the vehicle.

It is yet another object of the present invention to permit the discreet operation of a security barrier so that the means by which the motorist operates the barrier is not readily apparent to onlookers and minimizes unwanted operation of other vehicle equipment.

In accordance with these objects and with others that will be described and will become apparent below, a vehicle-integrated access control device for operating a security barrier from a motor vehicle, where the motor vehicle has a plurality of pre-existing vehicle equipment controls and the security barrier has a barrier control operatively connected thereto for selectively opening and closing the security barrier in response to an access control signal, comprises an access control signal transmitter capable of selectively operating the barrier control, the access control signal transmitter being operatively connectable to the plurality of equipment controls of the motor vehicle such that, when the plurality of equipment controls are operated in a predetermined manner, the access control signal transmitter operates the barrier control.

An exemplary embodiment of a vehicle-integrated access control device according to the present invention includes a logical AND device having first and second input channels and an output channel, each of the first and second input channels having an OFF condition and an ON condition, each input channel being operatively connectable to an equipment control of the motor vehicle so as to register an ON condition when the respective equipment control is being operated in a predetermined manner, the output channel of the logical AND device being operatively connected to the access control signal transmitter so as to cause the access control signal transmitter to operate the barrier control when the first and second input channels simultaneously register an ON condition. This provides a straightforward implementation of the present invention.

In another exemplary embodiment, the first and second input channels of the logical AND device are operatively connectable to the left and right turn signal controls of a motorcycle, respectively. This provides for easy, safe, discreet operation of the transmitter by manipulating familiar controls of the motorcycle.

In another exemplary embodiment, the first and second input channels of the logical AND device comprise first and second electrical input conductors, each electrically connectable to a circuit of the electrical system of a motor vehicle.

In another exemplary embodiment, the first and second input channels of the logical AND device form high-impedance electrical circuits between respective first and second electrical switches of the motor vehicle and the electrical ground of the motor vehicle, so that the input channels collectively draw an electrical current which is effectively zero compared to that drawn by the items of vehicle electrical equipment that are controlled by the first and second electrical switches of the motor vehicle. This prevents the present invention from interfering with the operation of vehicle equipment.

Another exemplary embodiment includes a voltage reducing circuit providing a reduced operating voltage from the motor vehicle electrical system to the access control signal transmitter. Optionally, the voltage reducing circuit includes a Zener diode or a voltage divider.

Another exemplary embodiment substitutes a pair of transistor switches for the logical AND device as described above, the transistor switches being so connected to first and second electrical circuits of the motor vehicle and to one another as to provide a power input to the access control signal transmitter when the first transistor switch provides a first transistor output voltage while second electrical circuit of the motor vehicle is closed. The first and second electrical circuits of the motor vehicle may be the left and right turn signal circuits of a motorcycle. The circuits may be controlled either by separate switches or by a single rocker switch having a left-signal, right-signal and neutral position.

Another exemplary embodiment includes a logical AND device, as described above, with the additional feature that at least one input channel latches for a predetermined period, so that sequential actuation of a first and second vehicle equipment control within a predetermined period will cause the access control signal transmitter to send an access control signal. This exemplary embodiment is particularly useful on vehicles in which the left and right turn signal equipment controls are operatively connected to a single rocker switch.

Also in accordance with these objects and with others that will be described and will become apparent below, a vehicle-integrated access control device for operating a security barrier from a motor vehicle, where the motor vehicle has a plurality of motor vehicle equipment controls and the barrier has barrier operating means capable of selectively admitting a vehicle past the barrier in response to an access control signal, comprises:

signal transmitting means providing an access control signal to the barrier operating means in response to an activating signal; and input means, operatively connected to the signal transmitting means, capable of providing an activating signal to the signal transmitting means when the plurality of motor vehicle equipment controls are operated in concert. In another exemplary embodiment, the input means are capable of providing the activation signal to the signal transmitting means when the plurality of motor vehicle equipment controls are operated simultaneously. The controls may be the left and right turn signals of a motorcycle.

Another exemplary embodiment includes first and second vehicle equipment control actuation detection means operatively connected to the first and second motor vehicle equipment controls and to the input means, the input means providing the activating signal to the signal transmitting means when the second motor vehicle equipment control is actuated within an interval beginning when the first equipment control is actuated and ending a predetermined time period after the first equipment control ceases to be actuated. This provides the latching function described above as useful where sequential inputs are intended to trigger transmission of the signal. The input means may comprise a logical AND device, or may comprise transistor switches, or any other logical or switching means sufficient to make the operation of the access control signal transmitting means dependent on the simultaneous (or sequential, as the case may be) actuation of equipment controls.

Also in accordance with these objects and with others that will be described and will become apparent below is a method of operating a security barrier from a motor vehicle where the motor vehicle has first and second pre-existing vehicle equipment controls and the security barrier has a barrier control operatively connected thereto for selectively opening the security barrier in response to an access control signal. This method comprises the steps of:

detecting an actuation of the first vehicle equipment control;

detecting an actuation of the second vehicle equipment control within an interval beginning with the actuation of the first vehicle equipment control and ending a predetermined time period after the cessation of actuation of the first vehicle equipment control; and transmitting the access control signal to the barrier control upon the detection of the actuation of the second vehicle equipment control.

The method may be implemented using a variety of components such as those described above and detailed hereinbelow.

It is an advantage of the present invention that to operate the security barrier, the motorist needs only to use familiar controls which already belong to the vehicle and therefore are properly designed and located for safe and convenient use and durability.

It is an additional advantage of the present invention that a motorist—and especially a motorcyclist, whose actions are in plain view—may transmit the access control signal without reaching for a control that onlookers might recognize as an access control.

It is yet another advantage of the present invention that the motorist may transmit the access control signal without operating the headlamps or other equipment of the vehicle where such operation would be unwanted or would attract unwelcome attention.

BRIEF DESCRIPTION OF THE DRAWING

The present invention will now be described with reference to the following figures, in which like elements are denoted by like reference numbers and wherein.

DETAILED DESCRIPTION OF THE INVENTION

Figure 1:
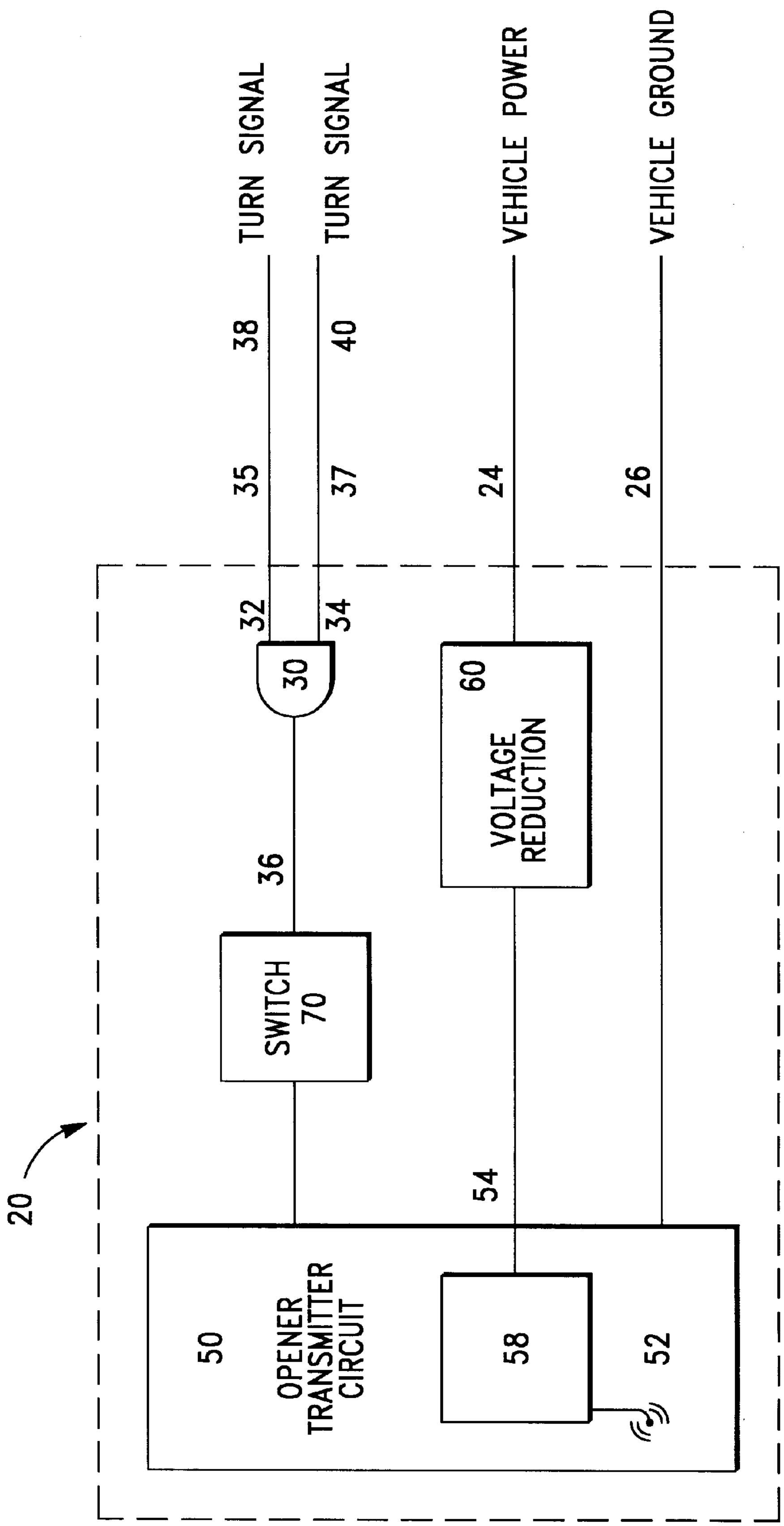
FIG. 1 shows a block diagram of an exemplary embodiment of the vehicle-integrated access control device according to the present invention.

An exemplary embodiment of the vehicle-integrated access control device according to the present invention is now described with reference to the block diagram of FIG. 1. The embodiment of FIG. 1, shown enclosed by broken lines, is suitable for installation on a motorcycle having separate left and right turn signal switches (as exemplified by the 1996 Harley Davidson Softtail brand motorcycle). This exemplary embodiment of the present invention is suited for use in conjunction with a motor-driven barrier control such as an electric garage door or security gate opener (not shown) and a radio receiver (also not shown) for controlling the opener in response to an access control signal. As is shown in the block diagram of FIG. 1, this exemplary embodiment includes a radio transmitter 50 for sending the access control signal, a logical AND device 30 for triggering the transmitter 50, a weatherproof enclosure 22 for attaching the access control device 20 to the motorcycle (not shown), and wires (discussed below) for connecting the access control device 20 to the motorcycle electrical system.

The logical AND device 30 has first and second input channels 32 and 34 and an output channel 36. The logical AND device 30 is configured such that, when an electrical potential is simultaneously applied to the first and second input channels 32 and 34, an electrical potential is observed at the output channel 36. Otherwise, the potential at the output channel 36 is effectively zero. The first and second input channels 32 and 34 are electrically connectable via input wires 35 and 37 to the left and right turn signal circuits 38 and 40, respectively, of the motorcycle.

The exemplary embodiment of FIG. 1 includes an access control signal transmitter 50 having a radiating antenna 52, a power input 54, and a radio frequency circuit 58 connected therebetween. The radio frequency circuit 58 transmits an access control signal via the radiating antenna 52 when suitable electrical power is supplied at the power input 54. The power input 54 is electrically connected to the output of the logical AND device.

Figure 2:
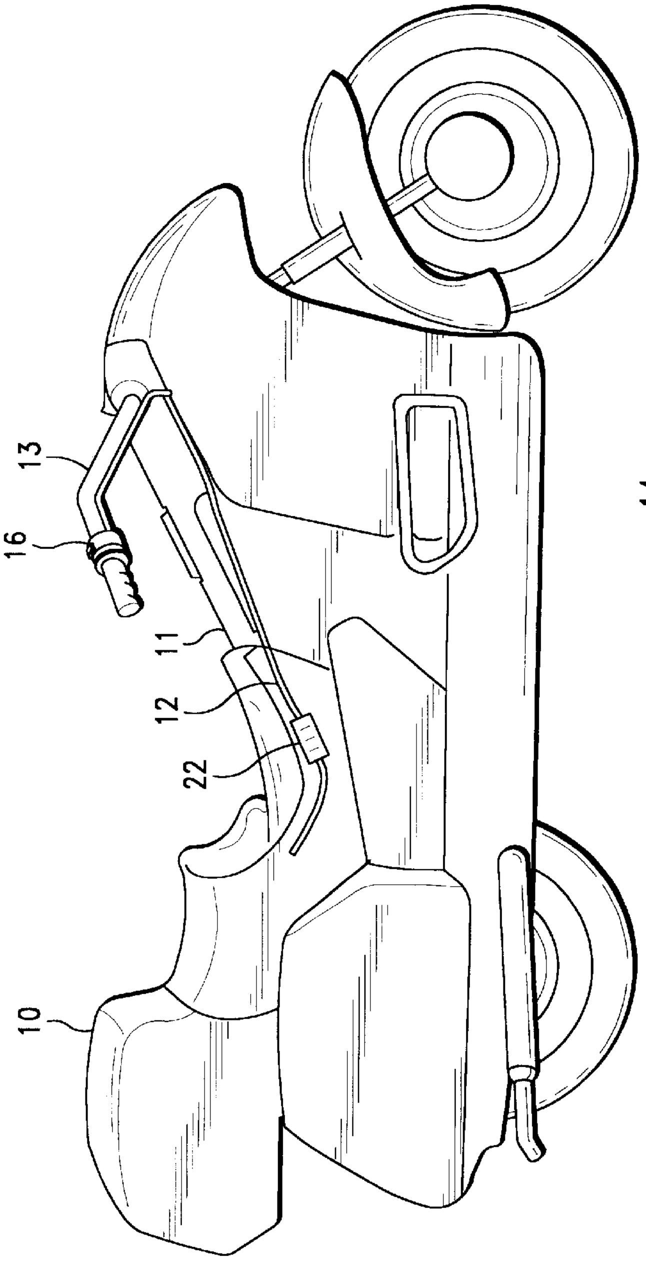
FIG. 2 shows a right side view of an exemplary embodiment of the vehicle-integrated access control device according to the present invention installed on a motorcycle.
Figure 3:
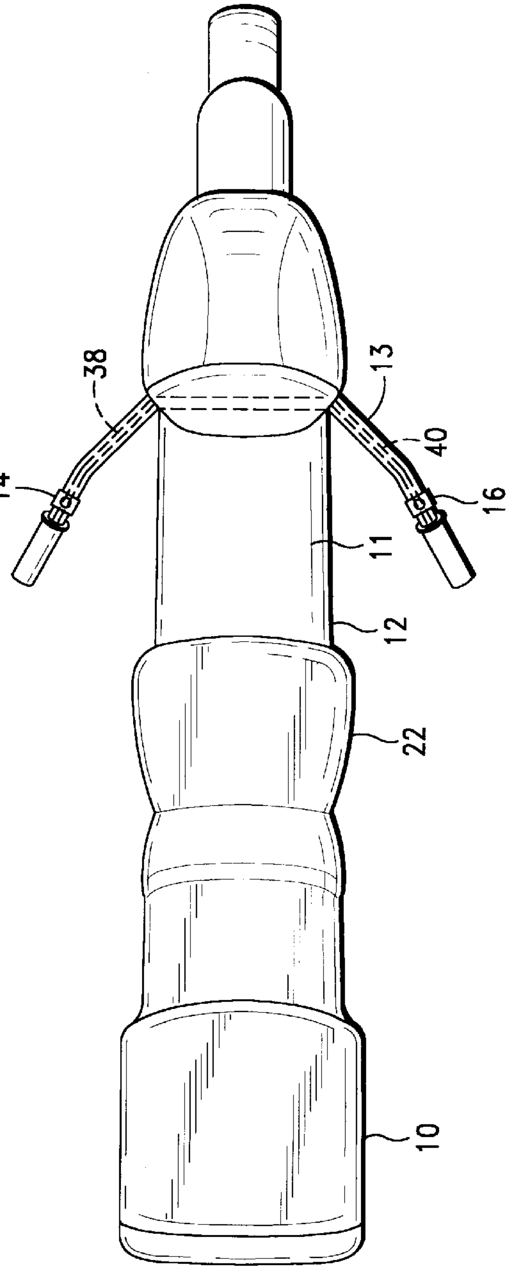
FIG. 3 shows a top view of an exemplary embodiment of the vehicle-integrated access control device according to the present invention installed on a motorcycle.

With continued reference to FIG. 1 and now also to FIGS. 2 and 3, the access control device 20 is provided within a weatherproof enclosure 22 constructed of, for example, a polymer material which permits radiation of the access control signal. The enclosure 22 is secured to the frame 11 of a motorcycle 10. Input wires 35 and 37 pass from the enclosure 22 to the harness 12 of the motorcycle where they are connected to the left and right turn signal circuits 38 and 40 of the motorcycle. Also connected to the harness 12 are the left and right turn signal controls (switches) 14 and 16 of the motorcycle. FIG. 2 shows a side view of a push-button right turn signal control 16 located on the handlebar 13. Any needed power input line 24 or ground line 26 is also passed from the access control device 20 through the enclosure 22 to the harness 12 and connected to a positive or ground wire therein needed. If electromagnetic radiation from the ignition system or alternator interferes with the operation of the access control device, the enclosure 22 and connecting wires 24, 26, 35 and 37 may be located away from the source of the interference.

With reference now to FIG. 3, a top view is shown of the left and right push-button turn signal controls 14 and 16 connected by left and right turn signal circuits 38 and 40 to the harness 12, to which is also connected the access control device 20.

To use the present invention in opening a security barrier, the motorcyclist simultaneously presses the left and right turn signal controls 14 and 16, thereby closing the left and right turn signal circuits. The simultaneous closure of the left and right turn signal circuits 38 and 40 of the motorcycle applies an electrical potential simultaneously to the first and second input channels 32 and 34 of the logical AND device 30, with the result that the output channel 36 of the logical AND device 30 supplies an electrical potential to the power input 54 of the transmitter 50. The radio frequency emitting circuit 58 then emits an access control signal via the radiating antenna 52. The receiver (not shown) then operates the motorized opener (not shown) in response to the access control signal.

It will be appreciated that the exemplary embodiment of FIG. 1 accepts control input from the motorcycle's turn signal controls and switches, which are already located and configured for safe, convenient use and are constructed and installed for durability. Advantageously, this provides the motorcyclist with the ability to operate a security gate or garage door without the need to remember, reach for, or manipulate an additional control on the motorcycle. Safety and convenience are thus improved. Additionally, it is unnecessary to add yet another expensive, weather-proof electrical switch to the motorcycle, and therefore also unnecessary to find a safe, practical location for such a new switch. Additionally, the motorcyclist's use of the turn signal controls in the specified manner is inconspicuous enough to escape casual observation. This improves the integrity of the security system for denying unauthorized access to the premises. Finally, it will be noted that most motorcycle electrical systems, like automotive electrical systems, are disabled when the ignition key is removed from the ignition switch. Thus, even a bystander who correctly perceives the manner in which the motorcyclist triggers the opener would not be able easily to operate the device without the ignition key.

It will be appreciated that a variety of motorized door or gate openers and a variety of access control signal transmitters are available for use with various embodiments of the present invention. Depending on the type of transmitter circuit employed and the type of logical AND device employed, practicality may favor various refinements and additional elements. For example, where the voltage of the motorcycle electrical system (commonly 12 volts) is outside the range of power input voltages that are acceptable to the transmitter (commonly between 3 and 9 volts), a voltage regulator circuit may be connected in series with the transmitter power input line 54. Such a voltage regulator circuit may include, for example, a Zener diode or a voltage divider. It would also be common and acceptable to interpose a relay or other switching device (70 in FIG. 1) between the output channel 36 of the logical AND device and the power input line 54 of the transmitter 50. Thus, when the potential at the output channel 36 changes from zero to a specified voltage, the switch or relay would connect the output of a voltage regulator circuit to the power input 54 of the transmitter 50.

The input channels 32 and 34 have high electrical impedance with respect to the power supplied by the motorcycle electrical system. This high impedance assures that the device according to the present invention does not cause a voltage drop which would interfere with other equipment on the motorcycle. Depending on the sensitivity of the components used to construct the present invention, it may be necessary to provide filtering means to protect the input channels 32 and 34, transmitter power input 54 or voltage regulator circuit 60 from voltage spikes. Such filters are well within the means of persons skilled in the art.

If desired, the access control device 20 and enclosure 22 may be provided to a motorcycle manufacturer without the connecting wires 24, 26, 35 and 37. Manufacturers may prefer such an embodiment where they are prepared use their own connecting wires to make the present invention an item of original equipment.

As an alternative to the logical AND device shown in FIG. 1, the present invention may be implemented by connecting each the input wires 35 and 37 to a transistor and interconnecting the transistors to one another and to the power input 54 of the transmitter 50 in such a manner that when the left and right turn signal switches are simultaneously closed, an electrical potential is applied to the power input 54.

Figure 4:
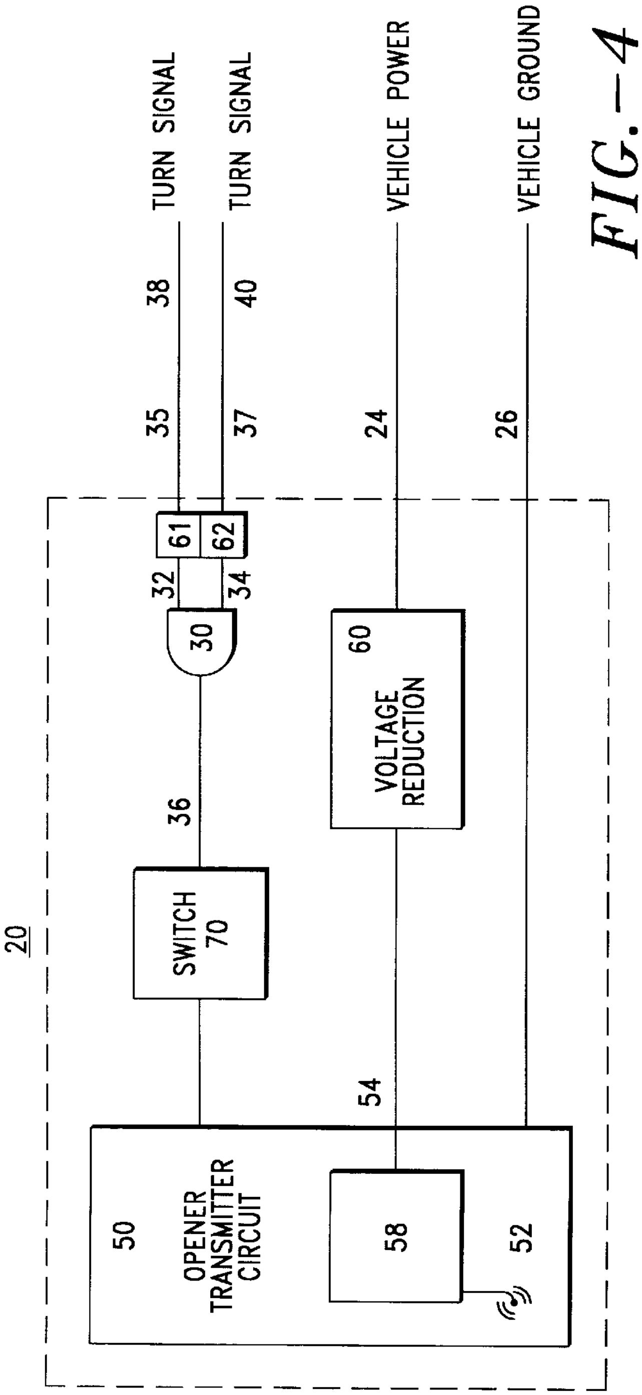
FIG. 4 shows a block diagram of an exemplary embodiment of the vehicle-integrated access control device according to the present invention.

With reference now to FIG. 4, a top view is shown of another exemplary embodiment of the vehicle-integrated access control device 20 according to the present invention is suitable for installation on a motorcycle having a single rocker switch 15 for operating both the left and right turn signals (as exemplified by certain Kawasaki brand motorcycles). If the rocker switch is incapable of being in both the left and right signaling positions at the same time, this alternative exemplary embodiment permits operation of the transmitter in response to the transition of the rocker switch into the right turn signal position within a predetermined interval after a transition of the rocker switch into the left turn signal position (or vice versa). An exemplary interval would be one-half-second. This exemplary embodiment differs from that of FIG. 1 by employing a latching logical AND device to detect the successive transitions of the rocker switch within the specified predetermined interval. The latching circuits of this exemplary embodiment are represented at 60 and 61 in the block diagram of FIG. 4. It will be apprecated that persons of ordinary skill will find a variety of circuits capable of providing this latching operation in conjunction with a logical AND device as shown in FIG. 1, in conjunction with transistors as shown in FIG. 2, or in conjunction with such other switching devices as may be selected. This exemplary embodiment is installed as is that of FIG. 1, by connecting the input wires 35 and 37 to the left and right turn signal circuits 38 and 40 at a suitable location, preferably on the harness at a location near the enclosure 22.

Figure 5:
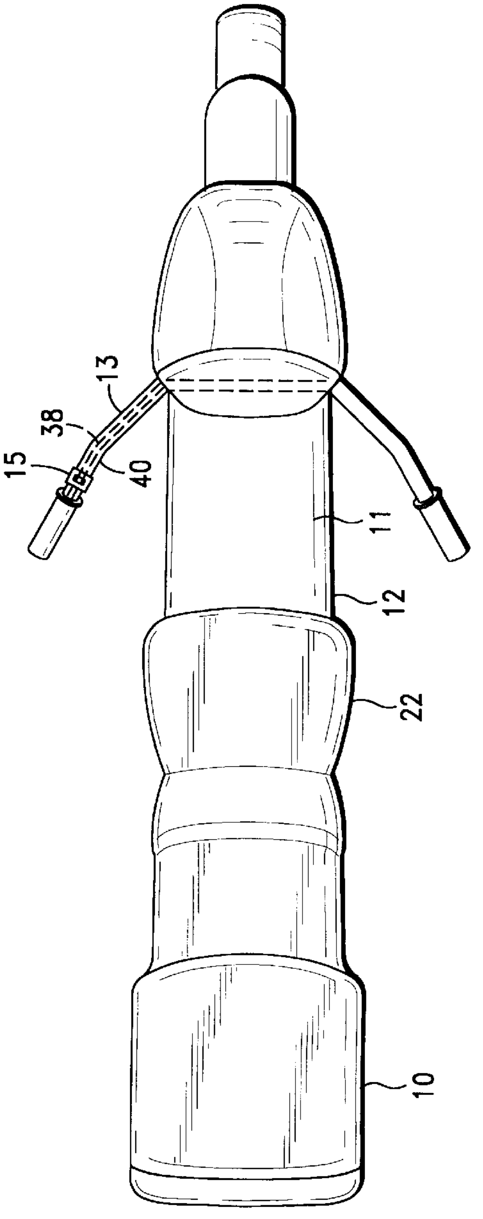
FIG. 5 shows a top view of an exemplary embodiment of the vehicle-integrated access control device according to the present invention installed on a motorcycle.

With reference now to FIG. 5, a top view is shown of the exemplary embodiment of FIG. 4 installed on a motorcycle. The access control device 20 and enclosure 22 are attached to the frame 11 of the motorcycle 10. Electrical connections are provided to the harness as has been discussed above with reference to FIGS. 1–3. The rocker switch 15 of the motorcycle is connected to the harness 12 via turn signal circuits 38 and 40.

In use, this alternative exemplary embodiment will activate the transmitter after the motorcyclist moves the rocker switch into the left turn signal position and then quickly to the right turn signal position. Depending on how quickly the turn signal lights respond to the closure of the turn signal circuits at the rocker switch, and on how quickly the motorcyclist returns the switch to the neutral position, there may be little or no observable flashing of the turn signal lights as the transmitter is activated.

While several exemplary embodiments of the present invention have been described, it will be understood that persons in the relevant art may conceive of many variations and modifications which are nevertheless within the scope and spirit of the present invention. For example, various logical devices, solid state or otherwise, may be adapted or combined in place of the logical AND device or the transistor switches described herein, and any switch, relay or relays may be consolidated or other current or voltage controlling devices may be substituted therefor. The transmitter may take any form so long as it is easily installed on the vehicle. Likewise, input from the vehicle equipment controls, be they the turn signal circuits of a motorcycle or other equipment controls of a motorcycle or other vehicle, may be conveyed to the device according to the present invention by electrical, magnetic, optical, acoustic, mechanical or fluid means, limited only by the craftsman's imagination. Accordingly, the present invention is to be limited solely by the claims that are appended below.

What is claimed is:

1. A vehicle-integrated access control device for operating a security barrier from a motor vehicle where the motor vehicle has a plurality of pre-existing vehicle equipment controls and the security barrier has a barrier control operatively connected thereto for selectively opening and closing the security barrier in response to an access control signal, the access control device comprising:

an access control signal transmitter capable of selectively operating the barrier control, the access control signal transmitter being operatively connectable to the plurality of equipment controls of the motor vehicle such that, when the plurality of equipment controls are operated in a predetermined manner, the access control signal transmitter operates the barrier control, said vehicle-integrated access control device further comprising a logical AND device, the logical AND device including first and second input channels and an output channel, each of said first and second input channels having an OFF condition and an ON condition, the first input channel being operatively connectable to a first equipment control of the motor vehicle so as to register an ON condition when the first control is being operated in a predetermined manner, the second input channel operatively connectable in like manner to a second equipment control of the motor vehicle, the output channel of the logical AND device being operatively connected to the access control signal transmitter so as to cause the access control signal transmitter to operate the barrier control when the first and second input channels simultaneously register an ON condition.

2. A vehicle-integrated access control device as set forth in claim 1, wherein the first and second input channels of the logical AND device are operatively connectable to the left and right turn signal controls of a motorcycle, respectively.

3. A vehicle-integrated access control device as set forth in claim 2, wherein the first and second input channels of the logical AND device comprise first and second electrical input conductors, each electrically connectable to a circuit of the electrical system of a motor vehicle.

4. For use in a motor vehicle having an electrical system including a ground, a plurality of items of electrical equipment, and a plurality of electrical switches controlling said items of electrical equipment: a vehicle-integrated access control device as set forth in claim 3, wherein the first and second input channels of the logical AND device form first and second electrical circuits between respective first and second electrical switches of the motor vehicle and the electrical ground of the motor vehicle, each of said electrical circuits having an electrical impedance sufficiently high that the input channels collectively draw an electrical current which is effectively zero compared to that drawn by the items of vehicle electrical equipment that are controlled by the first and second electrical switches of the motor vehicle.

5. A vehicle-integrated access control device as set forth in claim 4, wherein the access control signal transmitter has an operating voltage range, the access control device comprising a voltage reducing circuit providing a voltage within said range to the access control signal transmitter from the motor vehicle electrical system.

6. A vehicle-integrated access control device as set forth in claim 5, wherein the voltage reducing circuit includes a Zener diode having a threshold voltage within the operating voltage range of the access control signal transmitter.

7. For use in a motor vehicle having an electrical system including a positive pole, a ground and a plurality of electrical circuits, a vehicle-integrated access control device for operating a security barrier from a motor vehicle where the motor vehicle has a plurality of pre-existing vehicle equipment controls and the security barrier has a barrier control operatively connected thereto for selectively opening and closing the security barrier in response to an access control signal, the access control device comprising:

an access control signal transmitter capable of selectively operating the barrier control, the access control signal transmitter being operatively connectable to the plurality of equipment controls of the motor vehicle such that, when the plurality of equipment controls are operated in a predetermined manner, the access control signal transmitter operates the barrier control, said vehicle-integrated access control device further comprising a first transistor switch so connected to a first electrical circuit of the motor vehicle as to provide a first transistor output voltage when the first electrical circuit of the motor vehicle is closed; and a second transistor switch, connected to the first transistor switch and to a second electrical circuit of the motor vehicle so as to provide a second transistor output voltage when the first transistor switch provides a first transistor output voltage while second electrical circuit of the motor vehicle is closed, the second transistor providing a power input to the access control signal transmitter.

8. A vehicle-integrated access control device as set forth in claim 7, wherein the first and second electrical circuits of the motor vehicle are the left and right turn signal circuits respectively.

9. A vehicle-integrated access control device for operating a security barrier from a motor vehicle where the motor vehicle has a plurality of pre-existing vehicle equipment controls and the security barrier has a barrier control operatively connected thereto for selectively opening and closing the security barrier in response to an access control signal, the access control device comprising:

an access control signal transmitter capable of selectively operating the barrier control, the access control signal transmitter being operatively connectable to the plurality of equipment controls of the motor vehicle such that, when the plurality of equipment controls are operated in a predetermined manner, the access control signal transmitter operates the barrier control, said vehicle-integrated access control device further comprising a logical AND device, the logical AND device including first and second input channels and an output channel, each of said first and second input channels having an OFF condition and an ON condition, the first input channel being operatively connectable to a first equipment control of the motor vehicle so as to register an ON condition when the first control is being operated in a predetermined manner and for a predetermined time period thereafter, the second input channel operatively connectable to a second equipment control of the motor vehicle so as to register an ON condition when the second equipment control is operated in a predetermined manner, the output channel of the logical AND device being operatively connected to the access control signal transmitter so as to cause the access control signal transmitter to operate the barrier control when the first and second input channels simultaneously register an ON condition, whereby, when the first and second vehicle equipment controls are operated in a predetermined manner within a predetermined time period, the barrier control is operated.

10. A vehicle-integrated access control device as set forth in claim 9, wherein the first and second input channels of the logical AND device are operatively connectable to the left and right turn signal controls of a motorcycle, respectively.

11. A vehicle-integrated access control device as set forth in claim 10, wherein the first and second input channels of the logical AND device comprise first and second electrical input conductors, each electrically connectable to a circuit of the electrical system of a motor vehicle.

12. A vehicle-integrated access control device for operating a security barrier from a mot or vehicle where the motor vehicle has a plurality of motor vehicle equipment controls and the barrier has barrier operating means capable of selectively admitting a vehicle past the barrier in response to an access control signal, the access control device comprising:

signal transmitting means providing an access control signal to the barrier operating means in response to an activating signal; and input means, operatively connected to the signal transmitting means, capable of providing an activating signal to the signal transmitting means when the plurality of motor vehicle equipment controls are operated in concert, said vehicle-integrated access control device further comprising:

a first vehicle equipment control actuation detection means operatively connected to a first motor vehicle equipment control and operatively connected to the input means; and a second vehicle equipment control actuation detection means operatively connected to a second motor vehicle equipment control and operatively connected to the input means, the input means providing the activating signal to the signal transmitting means when the second motor vehicle equipment control is actuated within an interval beginning when the first equipment control is actuated and ending a predetermined time period after the first equipment control ceases to be actuated;

wherein the input means comprises a logical AND device having an output channel and first and second input channels, the output channel being operatively connected to the signal transmitting means, the first and second input channels being operatively connected to first and second vehicle control actuation detection means, each of the first and second vehicle control actuation detection means causing the corresponding first or second input channel to provide an ON condition to the logical AND device when the respective first or second motor vehicle control is actuated, the output channel of the logical AND device providing an activating signal to the signal transmitting means when the second input channel provides an ON condition within an interval beginning when the first input channel begins to provide an ON condition and ending a predetermined time period after the first input channel to provide an ON condition.

13. A vehicle-integrated access control device for operating a security barrier from a mot or vehicle where the motor vehicle has a plurality of motor vehicle equipment controls and the barrier has barrier operating means capable of selectively admitting a vehicle past the barrier in response to an access control signal, the access control device comprising:

signal transmitting means providing an access control signal to the barrier operating means in response to an activating signal; and input means, operatively connected to the signal transmitting means, capable of providing an activating signal to the signal transmitting, means when the plurality of motor vehicle equipment controls are operated in concert, said vehicle-integrated access control device further comprising:

a first vehicle equipment control actuation detection means operatively connected to a first motor vehicle equipment control and operatively connected to the input means; and a second vehicle equipment control actuation detection means operatively connected to a second motor vehicle equipment control and operatively connected to the input means, the input means providing the activating signal to the signal transmitting means when the second motor vehicle equipment control is actuated within an interval beginning when the first equipment control is actuated and ending a predetermined time period after the first equipment control ceases to be actuated;

wherein the input means comprises:

a first transistor switch so connected to a first electrical circuit of the motor vehicle as to provide a first transistor output voltage when the first electrical circuit of the motor vehicle is closed;

a second transistor switch so connected to the first transistor switch and to a second electrical circuit of the motor vehicle as to provide a second transistor output voltage when the second electrical circuit of the motor vehicle is closed within an interval beginning when the first electrical circuit is closed and ending a predetermined time period after the first electrical circuit ceases to be closed, the second transistor switch output voltage providing a power input to the access control signal transmitter.

* * * * *